United States Patent
Wu et al.

(10) Patent No.: US 6,513,114 B1
(45) Date of Patent: Jan. 28, 2003

(54) SYSTEM AND METHODS FOR PROVIDING SELECTABLE INITIALIZATION SEQUENCES

(75) Inventors: Frank L. Wu, Austin, TX (US); Shaojie Li, Austin, TX (US); George Mathew, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/457,016

(22) Filed: Dec. 8, 1999

(51) Int. Cl.⁷ .............................. G06F 9/445
(52) U.S. Cl. ............................................ 713/2
(58) Field of Search ........................ 713/1, 2

(56) References Cited

U.S. PATENT DOCUMENTS

| | | | |
|---|---|---|---|
| 5,388,267 A | 2/1995 | Chan et al. | 395/700 |
| 5,548,783 A | 8/1996 | Jones et al. | 395/836 |
| 5,628,027 A | 5/1997 | Belmont | 395/821 |
| 5,836,013 A | 11/1998 | Greene et al. | 395/652 |
| 6,353,885 B1 * | 3/2002 | Herzi et al. | 713/1 |

OTHER PUBLICATIONS

U.S. pending patent application Ser. No. 09/237,743 entitled "System and Method for Providing Bios–Level User Configuration of a Computer System" by Jim Dailey, et al. ; Dell USA, L.P., Filed Jan. 26, 1999.

Comdaq Computer Corporation, Phoenix Technologies, Inc., Intel Corporation, "BIOS Boot Specification"; Version 1.01, Jan. 11, 1996.

* cited by examiner

Primary Examiner—Thomas M. Heckler
(74) Attorney, Agent, or Firm—Baker Botts L.L.P.

(57) ABSTRACT

Methods and system for providing selectable initialization sequences are disclosed. The method of initializing a system includes providing at least one reference associated with a device coupled to the system. A user selects the reference associated with the device and an initialization sequence is determined based upon the selected reference.

16 Claims, 2 Drawing Sheets

SYSTEM AND METHODS FOR PROVIDING SELECTABLE INITIALIZATION SEQUENCES

TECHNICAL FIELD

The present disclosure generally relates to initializing computer systems and, more particularly, to a system and methods for providing selectable initialization sequences for computer systems and servers.

BACKGROUND

Technological advancements for increasing the number of peripheral devices for computer systems and servers have taken on many forms. Several types of peripheral devices have become available for computer systems allowing users to expand a system's basic functionality and configuration. For example, conventional systems can include expansion slots or bays connected to the system's mother board for connecting peripheral devices.

Two of the most common interfaces for connecting peripheral devices include Peripheral Component Interconnect (PCI) interface systems and small computer system interface (SCSI) systems. PCI and SCSI interfaces are configured with "hot-plugs" that allow users to add additional peripheral devices such as hard drives, tape drives, CD-ROM drives, scanners, etc. relatively easy. Hot-plugs provide the connection between an interface and a peripheral device using a small opening or panel in the computer system's housing allowing a user to plug in peripheral devices without powering down the computer system.

A PCI interface system is configured to communicate with a system's mother board and includes a plurality of expansion slots spaced closely together for high speed operation. PCI is designed to be synchronized with the clock speed of the mother board's microprocessor and can transmit, up to 64 bits of data using a 188-pin connection. A single peripheral device communicates with the system using a PCI controller that plugs into one of the PCI expansion slots. The controller also has a port connected to one end of the controller card for connecting the peripheral device to the system.

SCSI interface systems are similar to PCI interface systems in that SCSI allows systems to communicate with external peripheral devices. A SCSI interface communicates through a parallel interface that provides quick access and high data transfer rates. For example, a 16-bit interface can provide up to 80 megabytes of data per second. Unlike PCI, a single SCSI can support up to devices when the devices are connected in a "daisy-chain" fashion. One advancement in SCSI technology includes utilizing low voltage differential signaling for communicating with remotely located peripheral devices such as disk drives, scanners, printers, etc.

Conventional systems include peripheral devices connected to PCI or SCSI slots through the use of a device controllers that function as a communication interface between the added peripheral device and the system. Device controllers are configured with optional Read Only Memory (ROM) Integrated Circuits (ICs) that store initialization and run-time code. For example, when a system is turned on or rebooted, the system's initialization routine uses a controller's optional ROM code to initialize the peripheral device and provide run-time code for operating the device. During initialization, the system copies or "shadows" each controller's optional ROM code by loading the code into a portion of available system memory. The system then accesses the shadowed code of each controller during initialization and system operation.

A disadvantage of conventional systems can occur when too many peripheral devices are added to a system. Typically, a finite amount of memory is available to the system during initialization. During the system's initialization routine, the basic input/output system (BIOS) executes a power on self test (POST) that initializes the hardware associated with the system and upon completing POST the BIOS loads an operating system (OS). Therefore, a system having only a finite amount of memory available during POST can initialize a limited number of peripheral devices.

One conventional method used to shadow the controller's optional ROM codes is to shadow the optional ROM codes in a largest-to-smallest sequence. For example, a CD-ROM requiring 64 KB of memory for initialization would have its optional ROM code shadowed before a RAID device that requires 16 KB of memory. This method continues until all of the optional ROM codes are shadowed or until the available memory for shadowing optional ROM codes is exhausted. Consequently, an initialization error could occur if a user wanted to boot an OS from a peripheral device having a controller with a smaller relative optional ROM code that may or may not be shadowed during initialization. If the device having the bootable OS is not initialized, the system will be forced into an undesirable loop causing the system initialization to fail.

Another conventional solution allows users to disable some of the PCI optional ROM codes using an PCI/SCSI configuration menu. Although this technique is effective in "freeing-up" memory, it is disadvantageous because it allows initialization errors if a user unknowingly disables an optional ROM code of a device required for system initialization.

Another solution deployed by conventional systems allows users to disable device controllers via the system's BIOS set-up menu. Though effective, the user must know which device controllers are in which PCI slots before disabling the controller. This solution requires the user to open the system's housing and note the location of each device controller.

SUMMARY

The conceptual groundwork for the present disclosure involves initialization sequences for computer systems. In accordance with the teachings of the present disclosure, a system and methods are described for providing selectable initialization sequences.

According to one aspect of the present embodiment, a method for use in a computer system is disclosed. The method includes providing at least one reference associated with a device coupled to the system, selecting the reference associated with the device, and determining an initialization sequence based upon the selected reference.

More specifically, one embodiment of the method includes storing the initialization sequence in a medium, such as non-volatile memory device, associated with the system.

Another embodiment of the method includes configuring the method to be used with a basic input output system (BIOS) that deploys a power on self test (POST) routine.

A further embodiment of the method includes a POST routine configured to shadow an optional ROM code for the at least one device into a medium coupled to the system, the shadowing being based upon the determined initialization sequence.

According to another aspect of one embodiment, a method of initializing a computer system is disclosed. The method includes providing a device list associated with the system and determining an initialization sequence based upon the device list. The method further includes initializing at least one device coupled to the system based upon the determined sequence wherein the device list includes a reference to at least one device coupled to the system.

In another aspect of one embodiment, a method of providing initialization information for a system is disclosed. The method includes selecting information associated with at least one device coupled to the system and determining an initialization sequence based upon the selected information.

More specifically, one embodiment of the method includes selecting an operating system associated with at least one device coupled to the system.

In a further aspect of one embodiment, a system is disclosed. The system includes at least one processor, at least one storage medium coupled to the processor, at least one device coupled to the system, the device comprising an initialization reference associated with the device. The system further includes a program of instructions, associated with the system, the program of instructions including at least one instruction to determine an initialization sequence of the system based upon the at least one device.

In another aspect of one embodiment, a method of initializing a computer system is disclosed. The method includes providing a device reference for at least one device and allowing a user to select the at least one reference. The method determines an initialization sequence based upon the user selected reference and stores the initialization sequence in a medium associated with the system. The method also includes accessing the stored sequence during a BIOS initialization routine, wherein the BIOS initialization routine deploys a power on self test routine (POST). The method also includes shadowing an optional ROM code for the selected reference wherein the shadowing is based upon the initialization sequence.

It is a technical advantage that an initialization sequence can be selected by a user thereby allowing the user to selectively initialize peripheral devices during a POST routine.

It is another technical advantage that a system is provided having a BIOS set-up menu configured to allow a user to select an initialization sequence for selective peripheral devices. In this manner, the system can initialize a selected peripheral device having a desirable operating system.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

In an advantageous embodiment of the disclosure a computer system displays references for one or more devices coupled to the system. The references are displayed to a user via a set-up menu and allows a user to select a desirable system initialization sequence. The selected sequence is stored in a memory device, such as a non-volatile memory device, coupled to the system. During initialization of the system, the system's BIOS deploys a power on self test (POST) routine that copies or "shadows" initialization information for each device according to the selected sequence. In this manner, a customizable initialization sequence is afforded ensuring selective devices coupled to the system are initialized during a POST routine. Therefore, the disadvantages of current systems are overcome by allowing a user to load or boot an operating system from a desirable device. The system advantageously avoids encountering boot errors incurred during initialization due to non-initialized devices having a desirable operating system.

Figure 1:
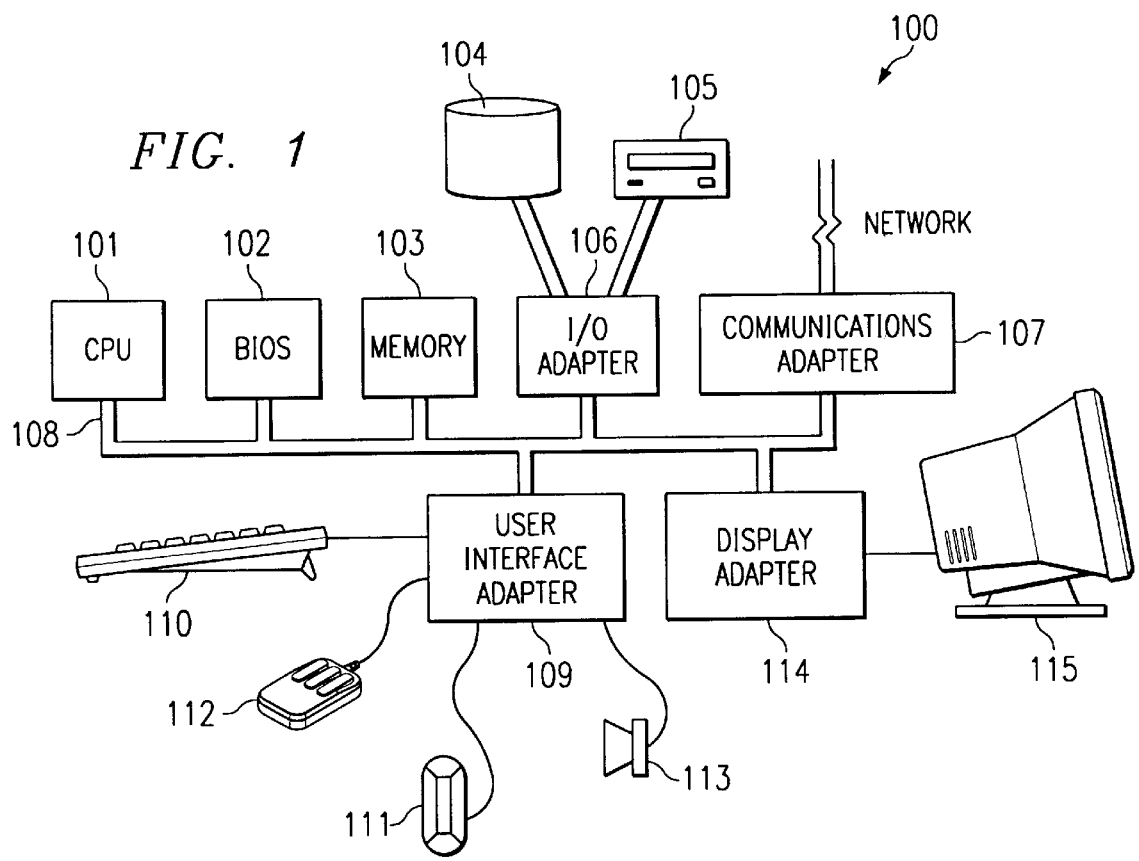
FIG. 1 is a block diagram of a computer system illustrative of embodiment of the present disclosure.

Referring to FIG. 1, a block diagram of a computer system illustrative of one embodiment of the present disclosure is shown. A system, indicated generally at 100, includes a central processing unit (CPU) 101 connected via at least one bus 108 to a basic input output system (BIOS) firmware 102, and memory, such as RAM, ROM, EEPROM, and any other memory devices, collectively designated by reference numeral 103. System 100 further includes an input/output adapter 106 for connecting peripheral devices such as SCSI drives 104 and RAID drives 105, and a display adapter 114 for connecting a display device 115 such as a Flat Panel Display (FPD) or a Cathode Ray Tube (CRT). A user interface adapter 109 is provided for connecting a keyboard 110, a mouse 112, a speaker 113, a microphone 111, and/or other user interface devices such as game controllers, touch pads, etc. System 100 also includes a communications adapter 107 for connecting system 100 to an information network such as an Intranet or the Internet.

BIOS firmware 102 includes a built-in software program, referenced generally as BIOS, accessible to system 100. The BIOS includes instructions for controlling the system's devices and testing memory. During operation, when system 100 is initially powered up, CPU 101 activates the BIOS. The BIOS runs a series of tests using a power on self test (POST) routine that initializes the system's hardware, chip registers, disk drives, power management, I/O ports and any other device requiring initialization by a POST routine. During POST, initialization information associated with the system's components are copied or "shadowed" in a predetermined sequence into a shadow area of the system's memory. For example, system 100 shadows an optional ROM code for RAID drive 105 to an available memory location within memory 103 based upon the predetermined sequence. Therefore, initialization of RAID device 105 is ensured during the POST routine such that, in one embodiment, an operating system stored within RAID device 105 can be loaded upon completing the POST routine.

Figure 2:
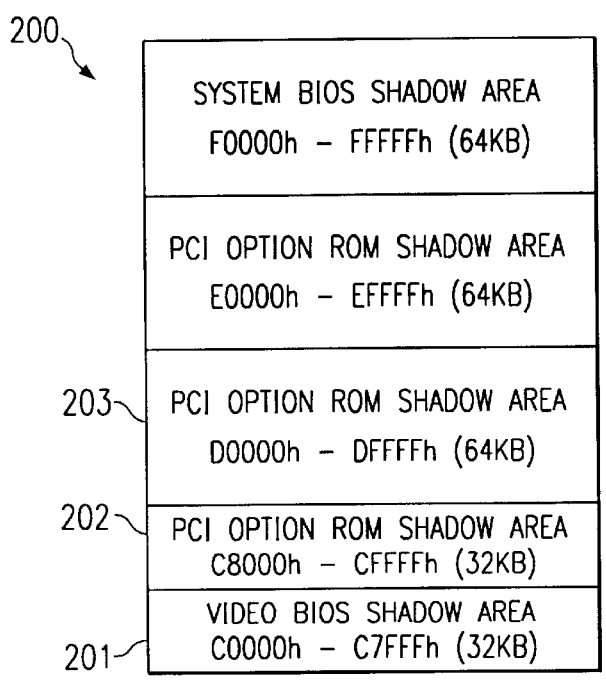
FIG. 2 is an illustration of a shadow memory area for a memory device according to an embodiment of the present disclosure.

FIG. 2 is an illustration of a shadow memory area for a memory device according to an embodiment of the present disclosure. A shadow memory area 200 includes memory location addresses for a plurality of devices. In an exemplary form, one embodiment illustrated includes the video BIOS for system 100 being shadowed in a first location as referenced by 201 followed by a PCI option ROM code of peripheral device, such as RAID drive 105, being shadowed second in a second location as referenced by 202. Subsequent locations for additional devices are also illustrated for shadow memory area 200 thereby depicting the total shadow memory available for system 100.

The present disclosure advantageously allows a user to select a sequence for shadowing initialization information into shadow memory area 200 of system 100 during the POST routine. The selected sequence allots a range of available memory addresses based on the determined initialization sequence. In the example illustrated in FIG. 2, the VIDEO BIOS for system 100 was determined to be the first device in the initialization sequence. Therefore, system 100 shadows the VIDEO BIOS at the lowest available shadow memory location (i.e. C000h-C7FFFh). Subsequently, first PCI Option ROM code 202 was shadowed second reflecting the second device determined in the initialization sequence. First Option ROM 202 occupies the next available shadow memory location (i.e. C8000h-CFFFh). Therefore, initialization information for each device is shadowed based upon the determined initialization sequence.

In this manner, devices such as RAID drives, SCSI drives, tape drives, etc. operably coupled to the system can be shadowed and initialized in a selectable sequence. Through providing a selectable initialization sequence, and in particular a selectable shadowing sequence, peripheral devices storing desirable information and applications can be selectively initialized allowing device accessibility during and after POST.

Figure 3:
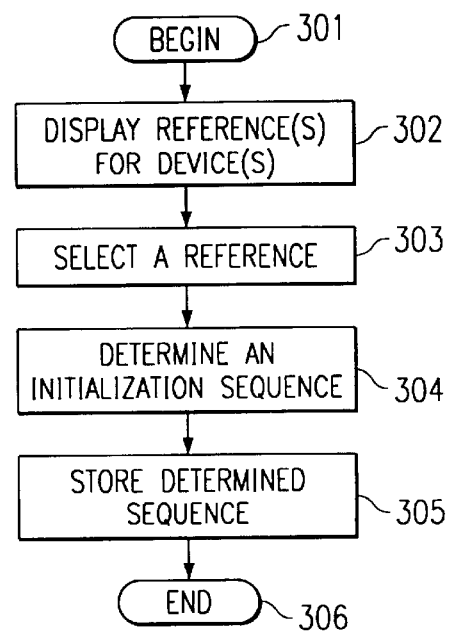
FIG. 3 is a flow diagram of one embodiment of a method for determining an initialization sequence.

Referring now to FIG. 3 a flow diagram of one embodiment of a method for determining an initialization sequence is shown. The method can be configured to be used with system 100 as illustrated in FIG. 1 or any other system configured to use initialization sequences.

In operation the method begins at step 301. At step 302, references for a plurality of devices coupled to system 100 are provided to a user through a user interface. For example, the user interface could include references for a CD-ROM device, a floppy disk drive, RAID devices, and/or a tape drive coupled to the system. In a preferred embodiment, the references are provided using an initialization configuration menu similar to a BIOS "set-up" menu commonly known in the art and accessible by system users. The set-up menu displays the current initialization sequence and references for the devices coupled to the system.

The user interface allows a user to modify the initialization sequence by selecting a device reference. For example, the user may want to initialize RAID drive 105 before any other storage device coupled to system 100. Therefore, the user would select that device to be initialized before the other storage devices. Subsequently, the method proceeds to step 304 and determines the initialization sequence based upon the user's selection. The method then proceeds to step 305 where the initialization sequence is stored memory 103 of system 100.

Upon initialization of system 100, the stored initialization sequence is accessed and during POST, initialization information is copied or shadowed memory 103 of system 100. For example, if RAID drive 105 was selected to be initialized first, the controller's PCI optional ROM code for RAID drive 105 is shadowed first, thereby ensuring that the RAID drive 105 is initialized and accessible by system 100 during and after POST.

In an alternate embodiment of method 300, a user can select the initialization of all of the devices displayed in the set-up menu. One skilled in the art can appreciate that method 300 can be modified to repeat steps 303 and 304 allowing a user to select the sequence for all of the devices displayed within the set-up menu.

Figure 4:
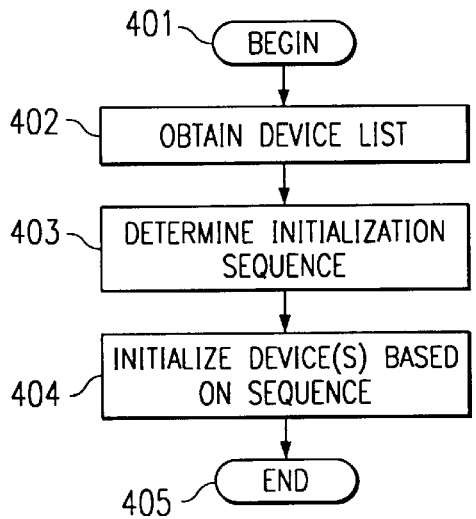
FIG. 4 a exemplary flow diagram of one embodiment of a method for initializing a system.

Referring now to FIG. 4 an exemplary flow diagram of one embodiment of a method for initializing a system is shown. The method can be configured to be used with system 100 as illustrated in FIG. 1 or any other system configured to use initialization sequences.

During operation, the method begins at step 401. At step 402 the method accesses a device list stored within memory 103 of system 100. In a preferred embodiment, the device list is stored in non-volatile memory and is accessed by the system's BIOS during initialization. The device list includes references to the system's devices (i.e. hard drives, tape drive, ROM drives, etc.) and an associated initialization "priority" for each device. For example, a RAID drive 105 may have a higher initialization priority than SCSI drive 104.

Upon accessing the device list, the method proceeds to step 403 where an initialization sequence is determined based upon the accessed information within the device list. For example, if RAID drive 105 has a higher priority than SCSI drive 104, RAID drive 105 would be initialized first. The method would then proceed to step 404 where system 100 would initialize the devices based upon the determined initialization sequence. Initialization is based upon the determined sequence and includes shadowing or copying initialization information into a shadow memory area of system 100. Similar to the illustration of FIG. 2, the highest priority initialization information is shadowed in the first available memory location with the next highest being shadowed after the first, etc. In this manner, a device can be initialized by the BIOS during POST based upon the information provided in the device list and the determined initialization sequence.

Figure 5:
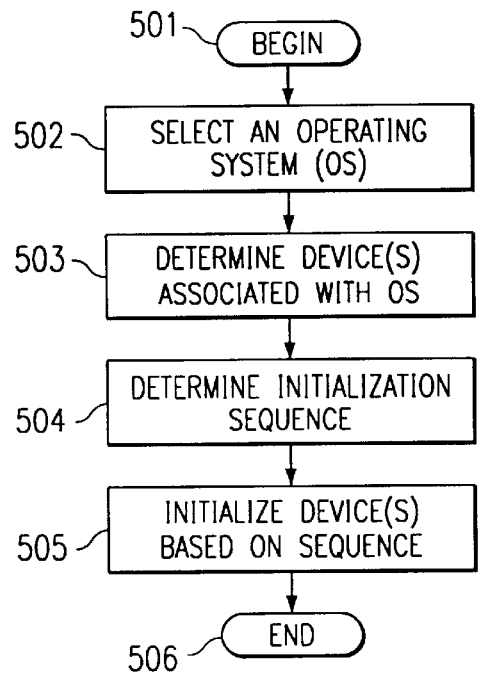
FIG. 5 illustrates a flow diagram of one embodiment of a method of initializing a system upon selecting information associated with the system.

Referring now to FIG. 5 an illustration of a flow diagram of one embodiment of a method of initializing a system upon selecting information associated with the system is shown. The method illustrated in FIG. 5 can be configured to be used with system 100 as illustrated in FIG. 1 or any other system configured to use initialization sequences.

During operation the method begins at step 501. At step 502, a user selects information associated with system 100. For example, a user may want to select one or more operating system's, such as LINUX or Windows NT, to boot from during the system's initialization. Upon the user selecting the information, the method proceeds to step 503 where the method determines which device is associated with the selected information. For example, the method would determine the storage location of an selected operating system such as SCSI drive 104. The method then proceeds to step 504 where an initialization sequence is determined based upon the selected information and at step 505 the method initializes the devices based upon the determined sequence.

As noted above, when system 100 is rebooted or turned on, the system's BIOS would access the determined initialization sequence. Upon deploying a POST routine, system 100 would copy or shadow initialization information, such as an optional ROM code for a RAID controller, into the system's shadow memory location. In this manner, initialization of the device during POST and having a desirable operating system or application is ensured.

Figure 6:
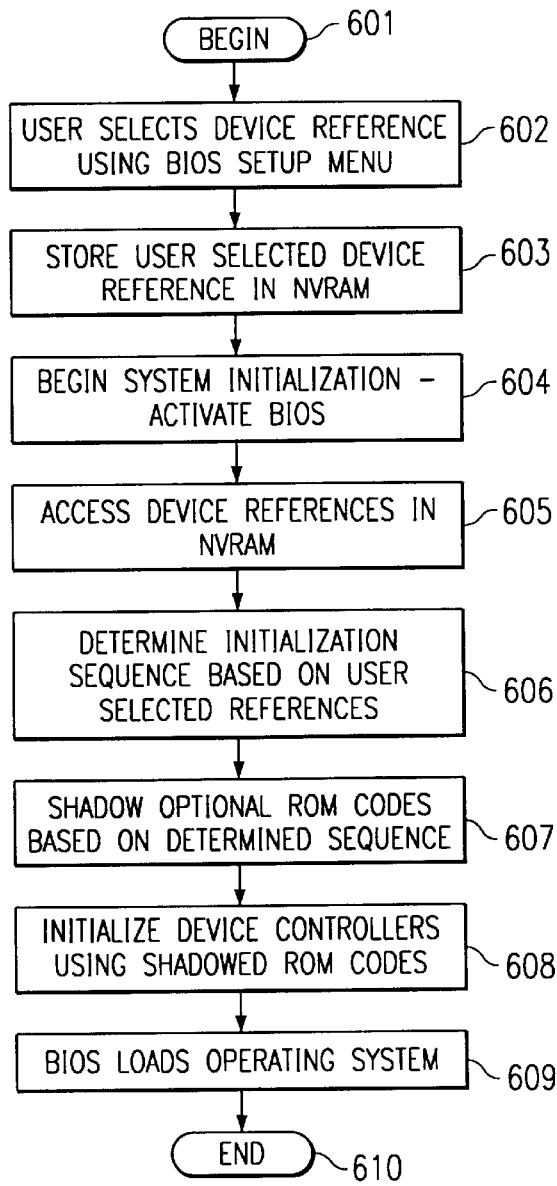
FIG. 6 illustrates a flow diagram of one embodiment of a method of initializing a system based on a selected initialization sequence.

Referring now to FIG. 6, an illustration a flow diagram of one embodiment of a method of initializing a system based on a selected initialization sequence is shown. The method illustrated in FIG. 6 can be configured to be used with system 100 as illustrated in FIG. 1 or any other system configured to use initialization sequences.

During operation the method begins at step 601. At step 602 a user selects a device reference using a BIOS set-up menu associated with system 100. For example, a user may want to initialize SCSI drive 105 coupled to system 100 and storing an operating system such as LINUX. The user would select the device reference for SCSI drive 105 and the method would proceed to step 603 where the user selected reference is stored in a non-volatile memory device, NVRAM, coupled to system 100. In a preferred embodiment, the user selected reference is stored in a device list located within the NVRAM. The device list includes initialization parameters associated with the devices coupled to system 100.

Upon storing the user selected device reference, the method proceeds to step 604 where the system initialization begins. Initialization includes activating the system's BIOS and deploying a POST routine. The method proceeds to step 605 where the device list stored in NVRAM is accessed. At step 606 information within the accessed device list is used to determine an initialization sequence for the devices coupled to system 100. The initialization sequence is determined by the user selected device references accessed in step 605 and stored within the device list.

Upon determining the initialization sequence, the method proceeds to step 607 where the optional ROM code for the selected device is copied or "shadowed" into the available shadow memory area of system 100. The initialization information is shadowed in the first available address of the shadow memory area. As previously illustrated, FIG. 2 depicts a shadow memory area for several devices. The user selected initialization sequence determines which address locations within shadow memory area are used during the POST routine. FIG. 2 illustrates the system's video BIOS ROM code shadowed into memory 103 followed by a first PCI optional ROM code, and a second PCI optional ROM code, etc. Therefore, the user selected initialization sequence determines the memory location for shadowing a selected device's initialization code. In this manner, a user can ensure a devices initialization information is shadowed thereby allowing access to the device during and after the POST routine.

Upon shadowing the optional ROM codes for the the shadowed codes are used to initialize the system's devices and device controllers. The method advantageously allows the system to initialize controllers based upon the user selected initialization sequence. The user can select a storage device having a desirable operating system to be initialized during POST allowing the BIOS to load an OS from the selected storage device. Upon the system loading an operating system the method proceeds to step 610 where the method ends.

Although the disclosed embodiments have been described in detail, it should be understood that various changes, substitutions and alterations can be made to the embodiments without departing from their spirit and scope.

What is claimed is:

1. A method of initializing a system comprising:
   providing a device reference for at least one device;
   allowing a user to select the at least one reference;
   determining an initialization sequence based upon the user selected reference;
   storing the initialization sequence in a medium associated with the system;
   accessing the stored sequence during a BIOS initialization routine, wherein the BIOS initialization routine deploys a power on self test routine (POST);
   shadowing an optional ROM code for the selected reference; and
   wherein the shadowing is based upon the initialization sequence.

2. A method according to claim 1 further comprising:
   after the operation of shadowing an optional ROM code for the selected reference, loading an operating system from the device associated with the selected reference.

3. A method according to claim 1 further comprising:
   after the operation of shadowing an optional ROM code for the selected reference, using the shadowed optional ROM code to initialize the device associated with the selected reference; and
   after the operation of using the shadowed optional ROM code to initialize the device associated with the selected reference, loading an operating system from the device associated with the selected reference.

4. A method according to claim 3 wherein:
   the operation of shadowing an optional ROM code for the selected reference comprises copying the optional ROM code for the selected reference from a non-volatile memory to a random access memory (RAM); and
   the operation of loading an operating system from the device comprises copying at least part of the operating system from a disk drive to the RAM.

5. A method according to claim 1 for initializing a system with multiple devices, wherein:
   the operation of determining an initialization sequence based upon the user selected reference comprises determining an initialization sequence that gives the device associated with the user selected reference priority over other devices among the multiple devices; and
   the operation of shadowing an optional ROM code for the selected reference, based upon the initialization sequence, comprises shadowing devices according to the stored initialization sequence, such that the device associated with the user selected reference is shadowed before the other devices are shadowed.

6. A method for managing at least part of a boot process in a computer system with a processor, at least one storage medium, at least first and second devices, a first optional ROM code associated with the first device, and a second optional ROM code associated with the second device, the method comprising:
   receiving input from a user specifying a higher initialization priority for a device reference associated with one of the first and second devices;
   storing, in the at least one storage medium, an initialization sequence for the first and second devices, such that the initialization sequence corresponds to the user-specified initialization priority;
   accessing the stored initialization sequence during a basic input/output system (BIOS) initialization routine;
   shadowing the first optional ROM code before shadowing the second optional ROM code if the stored initialization sequence reflects a higher user-specified initialization priority for the first device; and
   shadowing the second optional ROM code before shadowing the first optional ROM code if the stored initialization sequence reflects a higher user-specified initialization priority for the second device.

7. A method according to claim 6 further comprising a subsequent operation of attempting to load an operating system from at least one of the first and second devices.

8. A method according to claim 6 further including subsequent operations comprising:

using the shadowed optional ROM code to initialize at least one of the first and second devices; and subsequently, attempting to load an operating system from at least one of the first and second devices.

9. A program product for managing at least part of a boot process in a computer system with a processor, at least first and second devices, a first optional ROM code associated with the first device, and a second optional ROM code associated with the second device, the program product comprising:

at least one storage medium; and computer instructions stored in the at least one storage medium, wherein the computer instructions, when executed, perform operations comprising:

receiving input from a user specifying a higher initialization priority for a device reference associated with one of the first and second devices;

storing, in the at least one storage medium, an initialization sequence for the first and second devices, such that the initialization sequence corresponds to the user-specified initialization priority;

accessing the stored initialization sequence during a basic input/output system (BIOS) initialization routine;

shadowing the first optional ROM code before shadowing the second optional ROM code if the stored initialization sequence reflects a higher user-specified initialization priority for the first device; and shadowing the second optional ROM code before shadowing the first optional ROM code if the stored initialization sequence reflects a higher user-specified initialization priority for the second device.

10. A program product according to claim 9, wherein the computer instructions perform further operations in a subsequent stage of the boot process, the further operations comprising the operation of attempting to load an operating system from at least one of the first and second devices.

11. A program product according to claim 9, wherein the computer instructions perform further operations in subsequent stages of the boot process, the further operations comprising:

using the shadowed optional ROM code to initialize at least one of the first and second devices; and subsequently, attempting to load an operating system from at least one of the first and second devices.

12. A system comprising:

at least one processor;

at least one storage medium coupled to the processor;

at least first and second devices coupled to the processor;

a first optional ROM code associated with the first device;

a second optional ROM code associated with the second device; and computer instructions stored in the at least one storage medium, wherein the computer instructions, when executed, manage at least part of a boot process in the system by performing operations comprising:

receiving input from a user specifying a higher initialization priority for a device reference associated with one of the first and second devices;

storing, in the at least one storage medium, an initialization sequence for the first and second devices, such that the initialization sequence corresponds to the user-specified initialization priority;

accessing the stored initialization sequence during a basic input/output system (BIOS) initialization routine;

shadowing the first option ROM code before shadowing the second optional ROM code if the stored initialization sequence reflects a higher user-specified initialization priority for the first device; and shadowing the second option ROM code before shadowing the first optional ROM code if the stored initialization sequence reflects a higher user-specified initialization priority for the second device.

13. A system according to claim 12, wherein the computer instructions perform further operations in a subsequent stage of the boot process, the further operations comprising the operation of attempting to load an operating system from at least one of the first and second devices.

14. A system according to claim 12, wherein the computer instructions perform further operations in subsequent stages of the boot process, the further operations comprising:

using the shadowed optional ROM code to initialize at least one of the first and second devices; and subsequently, attempting to load an operating system from at least one of the first and second devices.

15. A system according to claim 12, wherein the system comprises a personal computer.

16. A system according to claim 12, wherein the system is configured as a server.

* * * * *